W. CORLISS.
RAILROAD CROSSING.
APPLICATION FILED FEB. 11, 1908.
910,786.
Patented Jan. 26, 1909.
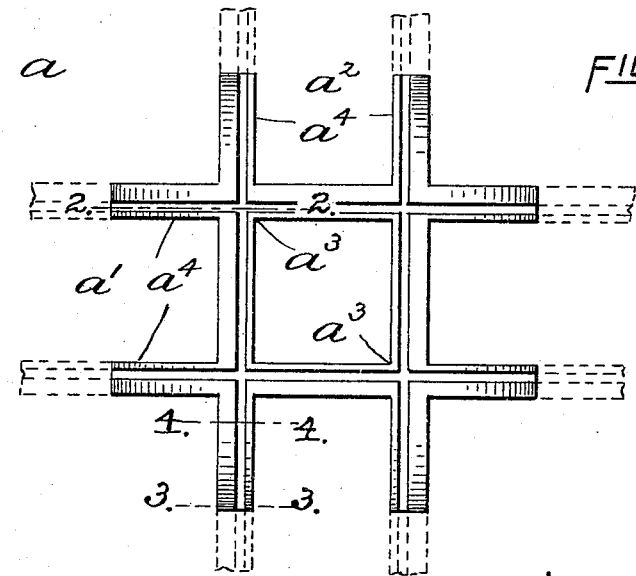
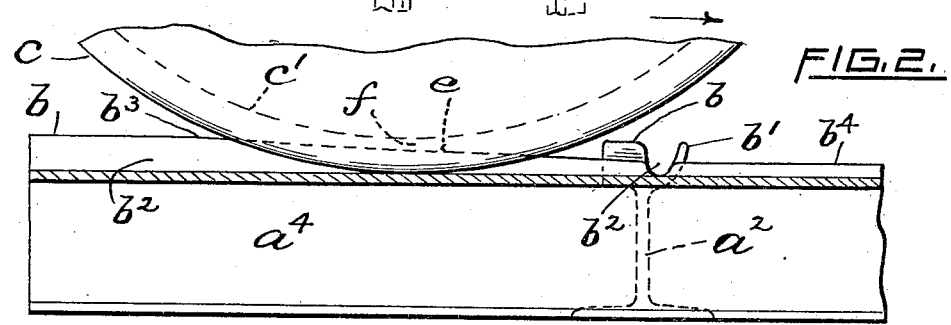
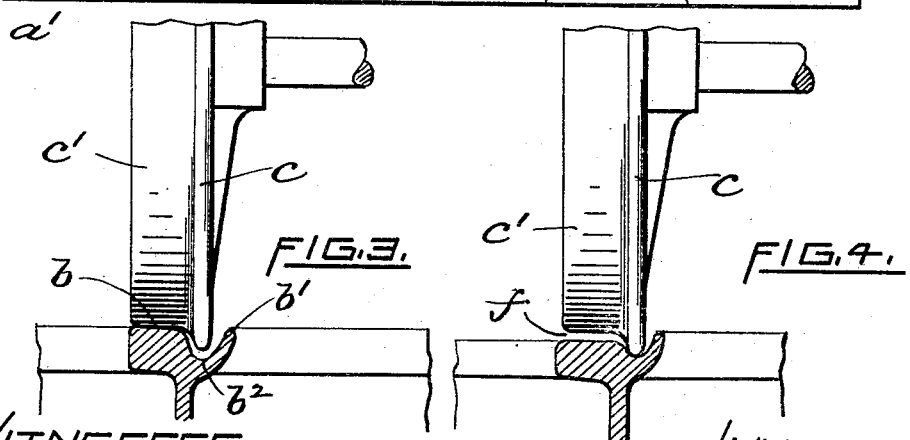
WITNESSES.
Tour Howard
E. W. Corliss
INVENTOR.
William Corliss.
By Charles T. Hannigan,
Attorney.

UNITED STATES PATENT OFFICE.

WILLIAM CORLISS, OF PROVIDENCE, RHODE ISLAND.

RAILROAD-CROSSING.

No. 910,786.　　　　Specification of Letters Patent.　　　Patented Jan. 26, 1909.

Application filed February 11, 1908. Serial No. 415,437.

*To all whom it may concern:*

Be it known that I, WILLIAM CORLISS, a citizen of the United States, residing in the city and county of Providence, State of Rhode Island, have invented a certain new and useful Improvement in Railroad-Crossings, of which the following is a specification.

My invention relates to an improvement in rail track cross-over structures adapted to permit the bearing tread of the car wheels to be transferred to the flange of the car wheels, before the latter come to the intersecting points of the cross tracks, in order to obtain a continuous crossing.

The object of this invention is to make a smooth way over intersecting railway tracks, thereby avoiding the jar, and discomfiture of passengers, and the annoyance that is experienced by all who reside in immediate proximity to such crossings, on account of the continual pounding of the wheels as they pass over intersecting tracks.

A still further object of the invention, is to reduce the cost of cross-over track construction, and at the same time reduce the expense of keeping such crossings in good working order.

In the accompanying drawings, Figure 1 represents a top plan view of a rail track crossing, as constructed in accordance with my improvement. Fig. 2 is an enlarged sectional view, taken on line 2.—2. of Fig. 1, showing a portion of a car wheel, as after its tread surface has left the tread surface of a rail, and the flange of said wheel bearing upon the bottom of the groove in the same. Fig. 3 is a sectional view, taken on line 3.—3. of Fig. 1, showing the tread surface of a car wheel in contact upon the tread surface of a rail, as in the usual manner. Fig. 4 is a sectional view, taken on line 4.—4. of Fig. 1, showing a clearance between the tread surface of the car wheel and rail, and the flange of said wheel in contact upon the bottom of the groove in the latter.

It is a well known fact that rail track crossings are a continual source of annoyance to the traveling public, and at the same time a great expense to the railway company. Intersecting rails make it necessary that all tracks be cut at the point of intersection, to admit the passage of the wheels upon the intersected track. This cutting of the tracks leaves a gap over which the car wheels must pass. The passage of the wheels over this gap in the rails is of course the cause of all the difficulty, for in such passing the wheels drop into the gap and must be lifted out, thus the drop and the lift are practically instantaneous, and this action occasions a destructive jolt and the pounding of the wheels, that rapidly destroys the structure however well it may be put together. The bottom of the groove in the rail is always smooth and straight, it does not have to be cut apart, as does the tread of the rail, hence by lowering the top of the rail sufficiently to allow the flange of the car wheel to take the bearing, I effectually prevent the wheel from dropping into the gap of the rails, as the wheel passes over the latter.

Like reference characters indicate like parts throughout the several views.

Referring to Fig. 1, $a$ designates a rail track crossing comprising two tracks $a^1$ and $a^2$. From the intersecting points $a^3$, $a^3$ of the tracks, the rails project for a certain distance so as to form extensions $a^4$, $a^4$. The rails have the usual outer tread portion $b$ and inner flange $b^1$, and between the tread and flange is provided a groove $b^2$, to receive the flange of the car wheel. From the normal tread surface $b$, at a point $b^3$ (see Fig. 2) each extension $a^4$ of the rails has its tread surface inclined downwardly toward the intersecting groove $b^2$ of the rails, as shown in said figure. Between each intersecting point of the cross tracks the surface of each rail extends straight, as at $b^4$ in Fig. 2, and which surface is at a lower level than the normal tread surface $b$, as shown in said figure. The ends of the rails of the crossing, which is an integral structure, coincide with the size and shape of the rails that lead to the crossing.

Assuming that the tread $c^1$ of the car wheel is in contact upon the normal tread surface $b$ of the rail and its flange $c$ free of contact with the bottom of the groove $b^2$, (see Fig. 3) as the wheel revolves to pass in the direction indicated by the arrow in Fig. 2, and has moved part way down the inclined surface $e$ of the rail, the flange $c$ of the wheel is caused to contact upon the bottom of the groove $b^2$ of the rail, in the manner shown in Fig. 2, thus a clearance $f$ is established between the tread surface of the wheel and tread surface of the rail (see Fig. 4), until the wheel has passed over the cross track and has again found its tread surface $c^1$ upon the normal tread surface $b$ of the rail, when the flange $c$ will then be again free of contact with the bottom of the groove $b^2$, the bottom of which groove extends in a straight plane throughout the rails of the cross-over structure. I thus transfer, for a brief space, the bearing of the wheel from its normal tread to its flange, and thereby secure a continuous contact crossing.

By simply grinding or planing off the top of the rail so as to give it a long taper,—say three-sixteenths of an inch in ten feet—permits the wheels to glide from one bearing to the other without any perceptible jar and at the same time pass over the gap in the rail without touching the ends of the latter. Therefore, it is evident that by my construction and arrangement of parts, I provide a rail track crossing which readily permits of transferring the car load upon the wheel base $c^1$ to the flange of said wheel, in order that the flange may have a continuous contact tread over the crossed track structure, and thereby prevent the wheel base $c^1$ from striking against the intersecting rails of the latter.

Having described my improvement, what I claim and desire to secure by Letters-Patent, is—

In a railroad crossing, intersecting rails provided each with a groove whose bottom extends in a straight line from end to end thereof to form a bearing surface for the flange of the car-wheel to contact upon, each rail having its normal tread surface, $b$, remote from the intersection of the cross track, and each rail disposing an inclined tread surface, $e$, extending downwardly from a common point on the normal tread surface to the intersection of the cross track, and each rail disposing a straight surface, as $b^4$, extending between the intersecting points of the tracks and at a lower level than the normal tread surface of the latter.

In testimony whereof I affix my signature in presence of two witnesses.

WILLIAM CORLISS.

Witnesses:
 TOM HOWARD,
 E. W. CORLISS.